United States Patent [19]

Vogel et al.

[11] Patent Number: 5,716,082
[45] Date of Patent: Feb. 10, 1998

[54] FLUID CONVEYING DEVICE WITH REMOVABLE CONNECTION

[75] Inventors: Herman Vogel, Newtown; E. Joel McCorkle, Woodbury, both of Conn.

[73] Assignee: The Perkin-Elmer Corporation, Norwalk, Conn.

[21] Appl. No.: 525,975

[22] Filed: Sep. 7, 1995

[51] Int. Cl.$^6$ ............................................. F16L 19/075
[52] U.S. Cl. .......................... 285/343; 285/904; 285/92; 285/339
[58] Field of Search ........................ 285/343, 342, 285/339, 904, 353, 382.7, 92

[56] References Cited

U.S. PATENT DOCUMENTS

| | | | |
|---|---|---|---|
| 3,295,870 | 1/1967 | Seablom | 285/343 |
| 3,380,764 | 4/1968 | Wilson | 285/904 |
| 3,561,794 | 2/1971 | Dobbelaere et al. | 285/52 |
| 3,591,208 | 7/1971 | Nicolaus | 285/343 |
| 3,659,881 | 5/1972 | Tinsley et al. | 285/343 |
| 3,929,358 | 12/1975 | Eckhardt | 285/353 |
| 3,938,554 | 2/1976 | Samuels | 137/625.61 |
| 3,951,418 | 4/1976 | Dryer | 285/343 |
| 4,088,447 | 5/1978 | Walker | 23/230 |
| 4,256,335 | 3/1981 | Nielsen, Jr. | 285/382.7 |
| 4,491,427 | 1/1985 | Debnam, Jr. et al. | 374/208 |
| 4,602,809 | 7/1986 | Ross et al. | 285/904 |
| 4,669,763 | 6/1987 | Phillips | 285/346 |
| 5,033,756 | 7/1991 | Sixsmith et al. | 285/904 |

*Primary Examiner*—Eric K. Nicholson
*Attorney, Agent, or Firm*—David Aker; Herbert S. Ingham; Edwin T. Grimes

[57] ABSTRACT

A cryogenic fluid conveying device has removable connection of a metal tube and a receptor for the tube. The receptor is formed of a housing member with an aperture therein for conveying the fluid. A tubular member of resilient PTFE has a bore size so as to be slidingly receptive of the rigid tube. A ferrule is disposed on the tubular member which is positioned in the housing member. An annular nut is threaded onto an end of the housing to constrict the ferrule and thereby constrict an annular section of the tubular member. This constriction provides a sealingly tight fit for the rigid tube such that the metal tube can be inserted into and removed from the tubular member.

9 Claims, 1 Drawing Sheet

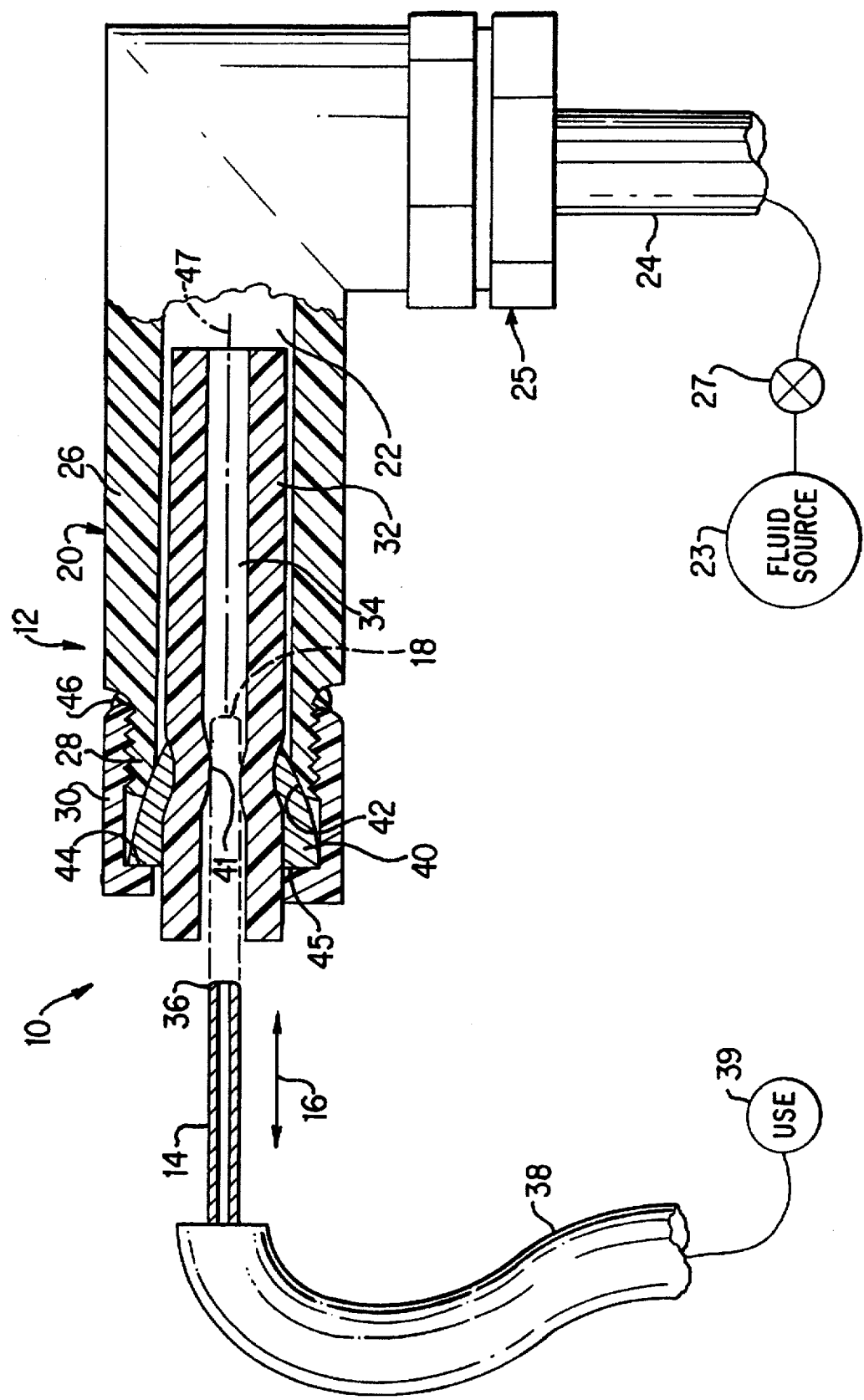

FLUID CONVEYING DEVICE WITH REMOVABLE CONNECTION

This invention relates to conveyance of cryogenic fluid, and particularly to a cryogenic fluid conveying device with a removable connection.

BACKGROUND OF THE INVENTION

There often is a requirement to quickly disconnect and quickly reconnect the ends of a pair of tubes or the like which convey a fluid, particularly a cryogenic fluid such as liquid nitrogen, oxygen, hydrogen or helium. For example, some calorimeters utilize liquid nitrogen, and the ducting needs to be disconnected and reconnected easily and frequently. The connections must be capable of withstanding operational pressures.

Various systems are used to provide a removable connection for the conveyance of fluids in tubing. For example, a rubber tube may be pushed over the end of a rigid tube and a hose clamp applied. In another example, each of the ends of the piping to be connected may terminate in an end plate, and the end plates with an o-ring between are bolted or clamped together. Another, which is used for water hoses and is known as a "quick connect", has an o-ring or similar gasket near the end of a fitting with a spring loaded member forced against the o-ring; the member can be slid back to release the fitting. Plumbing fittings with ferrules are used to connect rigid pipes.

Current connectors for liquid nitrogen and the like require the use of physical means to hold parts together and require tools for connecting and reconnecting. A basic problem in cryogenic applications, such as with liquid nitrogen, is that the low temperatures embrittle o-ring or other ordinary gasket materials. Thus cryogenic ducting systems cannot be used with o-ring or similar soft gasket materials that are exposed to the low temperatures. Other gasket materials such as soft metals may also become hardened at low temperatures, or at best cannot be used repeatably with reliability as they are not resilient under compression. Other systems such as those using ferrule connections or hose clamps that require screwing and unscrewing each time are relatively slow and inconvenient.

Therefore, an object of the invention is to provide a novel fluid conveying device with a removable connection, such device being usable with cryogenic fluids. Another object is to provide such a device that is rapid and simple to use for repeated disconnections and reconnections. A further object is to provide such a device that does not require the use of a tool for disconnections and reconnections.

SUMMARY

The foregoing and other objects are achieved, at least in part, by a cryogenic fluid conveying device with a removable connection, wherein the device includes a rigid tube (such as metal) and a receptor for the tube. The receptor comprises a tubular resilient member and a constriction means. The member has a bore therethrough for conveying a cryogenic fluid, and is formed of a slippery resilient material. The constriction means constricts an annular section of the resilient member. The bore of the resilient member has a size without constriction so as to be slidingly receptive of the rigid tube. The constriction means constricts the annular section to a sealingly tight fit for the rigid tube such that the rigid tube can be inserted into and removed from the resilient member including the constricted annular section.

In a preferred embodiment, the receptor further comprises a housing means. The housing means includes a housing member having a threaded end with the aperture extending coaxially therethrough, and an annular member threaded to the threaded end. The constriction means comprises the annular member and a ferrule disposed on the resilient member. The resilient member is positioned in the aperture with the ferrule located at the threaded end. The annular member and the threaded end are configured cooperatively so that relative tightening by threading constricts the ferrule on the annular section. The resilient member thereby is affixed sealingly into the aperture, and the resilient member is constricted for the sealingly tight fit.

In a further embodiment, the ferrule, the rigid tube and the resilient tube are formed of respective materials selected cooperatively with relative thermal expansion coefficients so that the constriction means constricts the resilient tube further on the inserted rigid tube as the cryogenic fluid is passed through.

BRIEF DESCRIPTION OF THE DRAWING

The drawing is a longitudinal view of a device of the invention, with sectioning of housing and constriction components of the device.

DETAILED DESCRIPTION

The present invention is directed to the conveyance of a cryogenic fluid. As used herein and in the claims, the term "cryogenic fluid" means a low temperature gas or liquid obtained from the low temperature liquified phase of a substance that is otherwise gaseous at atmospheric temperature and pressure, such as liquid nitrogen, oxygen, hydrogen or helium.

A device 10 according to the invention includes a receptor 12 and a rigid tube 14. The receptor and the tube each can convey fluid, and are particularly adapted to convey a cryogenic fluid. The tube, shown in a disconnected position, can be connected simply by insertion into the receptor to convey the fluid from the 30 receptor to the tube (or vice versa). The tube also can be removed from the receptor for disconnection, the movement to do so being shown in the drawing by arrows 16, with the inserted tube shown by broken lines 18.

The receptor 12 includes a housing assembly 20 with a cylindrical aperture 22 therein for conveying the fluid which may be a gas or a liquid. The assembly may be free or mounted in any desired manner that does not interfere with the invention. The device is particularly suitable for cryogenic applications wherein the fluid is liquid nitrogen or the like. Thus, although the housing assembly may be metallic, for such applications the components preferably are made of a polymer such as vinyl, high density polyethylene or polytetrafluoroethylene (PTFE). The housing assembly is connected to additional tubing 24 or other means for further conveying the fluid. The nature of such tubing is not relevant to the invention but may be, for example, copper tubing leading to a source 23 of the fluid which preferably is a cryogenic fluid. The tubing may be attached to the assembly 20 by a conventional ferrule system 25 or the like. Generally a valve 27 is associated with the source.

In a preferred and advantageous aspect, components are used that normally are used for a conventional ferrule connector, for example Swagelock™, such as Swagelock part number T-400-1-4. Ferule connectors normally (but not in this case) are used with rigid pipes to permanent or at least semi-permanent connection.

In the present case, the housing assembly 20 includes a housing member 26 having a threaded end 28 with the aperture 22 extending coaxially therethrough. Although the threaded end may be male or female, such a component for a ferrule usually is available with a male threaded end. The housing assembly also includes an annular member 30 of opposite gender is threaded to the threaded end, being a female nut in the usual and present case. Hexagonal (or other functional) externals for the nut 30 and member 26 are provided to allow tightening by threading of the annular member on the end by wrench or the like. This tightening generally is effected only initially, without further adjustment except perhaps after several hundred cycles of disconnections and reconnections.

A length of resilient tubing, usually only a short length, forms a tubular member 32 that is affixed sealingly in the aperture at the threaded end 28. This resilient member is formed of a slippery resilient material which may be polyethylene, polyvinyl chloride, Delrin™, graphite loaded silicone rubber or the like. Advantageously the material is a fluorine-containing polymer such as PTFE sold under the trade name of Teflon™.

The rigid tube 14 is provided to convey the fluid to or from the receptor 12 and thence to or from the additional tubing 24. The bore 34 of the resilient member 32 has a size (without the constriction described below) that is selected cooperatively with the tube size to be slidingly receptive of the rigid tube. It is desired to removably insert the tube into the resilient tubing, and for such purpose the tube end 36 should be beveled or rounded slightly around the forward edge to avoid cutting the resilient member. For the sliding fit, the bore should be slightly less (for example up to 5% less) than the outer size of the tube. The tube also should be long enough or otherwise have a configuration for manual gripping (unless mechanically manipulated). The tube 14 may be formed of a rigid polymer or a ceramic or, for most cases, a metal such as brass or stainless steel. The resilient material for the tubing member 32 must be specifically slippery to the tube 14 which should have a smooth surface.

The other end of the tube 14 is connected to further tubing 38 such as flexible silicone rubber, or to a channel or other fluid conveyance that leads to a point of use 39 or storage for the fluid. Direction of fluid flow obviously may be reversed from this example and is not important to the invention. As some longitudinal movement is required for insertion of the tube into the resilient member, at least one of the auxiliary tubings should be flexible, such as by an orthogonal portion, coiling, bellows or (as illustrated) the tubing 38 simply is a flexible tube of rubber or the like.

A constriction means provides a constriction 41 in an annular section of the resilient member 32 in the housing assembly 20 to reduce the sliding fit to a sealingly tight fit for the rigid tube 14. The tight fit is such that the rigid tube can readily be inserted into and removed from the resilient member including the constricted annular section. In a preferred embodiment, the constriction is effected with a ferrule 40 disposed on the resilient member 32, the resilient member being positioned in the aperture 22 with the ferrule at the threaded end 28.

The annular member 30 and the threaded end 28 are configured cooperatively such that relative tightening constricts the ferrule on the member 32. This is achieved, advantageously, by providing a taper 42 to the aperture 22 at the threaded end to widen the aperture outwardly toward the end. The annular member has a shoulder 44 to urge the ferrule the ferrule into the taper. The ferrule preferably has a tapered external surface that matches the taper in the threaded end, with a perpendicular land 45 at the other end of the ferrule adapted to the shoulder 44. Thus tightening of the annular member by threading forces the ferrule into the threaded end to cause constriction of the ferrule onto the resilient member 32. The ferrule thereby seals the tubular member into the aperture, and also provides the constriction 41 in the resilient member for the sealingly tight fit with the tube. The tube seals by compressing the resilient material under the ferrule. The rigid tube is not crimped by the constriction. Variations in the ferrule and associated structures may provide substantially the same result; for example, the taper and corresponding configurations may be turned around from the positions described above.

The ferrule is constricted just enough to effect the desired fit. Once a suitable tightening of the ferrule is made, no further adjustment should be necessary or desirable. Therefore, it may be advantageous to lock or bond the annular member 30 in place by such means as a counter nut, a conventional locking compound (such as Locktite™) in the threads, or (as shown) addition of a cement 46 to the threads after adjustment. However, the ferrule ordinarily will maintain its compression even if the annular member is removed, so such locking may not be necessary provided that the nut is not subsequently tightened excessively. Alternatively, the body may be removed from the ferrule, and connections may then be made with the tube 14 to a simple device consisting only of the flexible member 32 with the ferrule 40. In this case the flexible member is held directly onto the tubing 24 by a tight fit or hose clamp.

Preferably the materials for the ferrule, the rigid tube and the resilient tube are selected cooperatively with relative thermal expansion coefficients so that the ferrule constricts the resilient tube further with cooling as the cryogenic fluid is passed through. This is achieved, for example, with brass ferrule, a stainless steel tube (e.g. 316 stainless) and PTFE resilient tube material. Thus the ferrule is constricted so that the tube can easily be inserted and removed with no fluid flow and then, with cryogenic fluid passing through, the connection is quite tight.

Other means for the constriction may be used. For example, a tight ring or band may be forced over the resilient tube to cause a constriction in the bore. The ring then may be cemented or otherwise retained in the aperture. Alternatively, the aperture wall may have an annular constriction similar to a ring, so that when the tube is forced in, the tube bore is constricted. Preferably any such ring or band is uniformly circular; for example an ordinary hose clamp with a circumferential gap at the adjustment location may constrict non-uniformly and allow leaking in the connection with the rigid tube. The ferrule system has a significant advantage over a fixed ring or band, by being adjustable to the precise point of a sealingly tight fit for the rigid tube that still allows removal and reinsertion of the rigid tube.

As an example of size, the rigid tube has an outside diameter of 3.175 mm (⅛ inch), and the resilient member then is slightly smaller for its inside diameter for the sliding fit. Such a member may have an outside diameter of 6.35 mm (¼ inch) and a length of about 2 cm (¾ inch).

The device described above is for a single combination of rigid tube and receptive assembly. However, a multiplicity of either or both may be used for selective coupling, for example to direct liquid nitrogen to one of several points of use. Also, in the present example, insertion and removal are manual. Alternatively, a conventional type of mechanism (not shown) may be provided for automatic insertion and removal of the rigid tube in the housing, with manipulation for selective coupling if used.

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

What is claimed is:

1. A cryogenic fluid conveying device having a removable connection, the device including a rigid tube and a receptor for the tube, the receptor comprising a tubular resilient member having a bore therethrough for conveying a cryogenic fluid and being formed of a slippery resilient material, and constriction means for providing a constriction in an annular section of the resilient member, the bore of the resilient member having a size without the constriction so as to be slidingly receptive of the rigid tube, wherein the constriction effects a sealingly tight fit for the rigid tube such that the rigid tube can readily be inserted into and removed from the resilient member with the constriction maintained, the rigid tube being non-crimped by the constriction.

2. The device of claim 1 wherein the resilient member is formed of a fluorine-containing polymer, and the rigid tube is metallic.

3. The device of claim 1 wherein the constriction means, the rigid tube and the resilient member are formed of respective materials selected cooperatively with relative thermal expansion coefficients so that the constriction means constricts the resilient tube further on the inserted rigid tube as the cryogenic fluid is passed through.

4. The device of claim 1 wherein the receptor further comprises a housing means with a cylindrical aperture therein for conveying the fluid, the resilient member being affixed sealingly in the aperture with the constricted annular section in the housing means.

5. The device of claim 4 further comprising means for flowing a cryogenic fluid through the receptor with the rigid tube inserted therein.

6. The device of claim 5 wherein the housing means comprises a housing member having a threaded end with the aperture extending coaxially therethrough, and an annular member threaded to the threaded end, wherein the constriction means comprises the annular member and a ferrule disposed on the resilient member, the resilient member is positioned in the aperture with the ferrule located at the threaded end, and the annular member and the threaded end are configured cooperatively with relative tightening thereof by threading to constrict the ferrule on the thin annular section of the resilient member, thereby affixing the resilient member sealingly into the aperture, and constricting the resilient member for the sealingly tight fit.

7. The device of claim 6 wherein the ferrule, the rigid tube and the resilient member are formed of respective materials selected cooperatively with relative thermal expansion coefficients so that the constriction means constricts the resilient tube further on the inserted rigid tube as the cryogenic fluid is passed through.

8. The device of claim 7 wherein the resilient member is formed of PTFE, the rigid tube is formed of stainless steel, and the ferrule is formed of brass.

9. The device of claim 1 wherein the bore of the resilient member has a size without the constriction so as to be slidingly receptive of the rigid tube without cryogenic fluid in the device, wherein the constriction effects a sealingly tight fit for the rigid tube with cryogenic fluid in the device, such that the rigid tube can readily be inserted into and removed from the resilient member the constriction maintained without cryogenic fluid in the device.

* * * * *